United States Patent
Suzaki et al.

(10) Patent No.: US 11,605,181 B2
(45) Date of Patent: Mar. 14, 2023

(54) CONTROL APPARATUS, CONTROL SYSTEM AND CONTROL METHOD

(71) Applicant: NIPPON TELEGRAPH AND TELEPHONE CORPORATION, Tokyo (JP)

(72) Inventors: Kohei Suzaki, Musashino (JP); Yusuke Asai, Musashino (JP); Hiroyuki Shiba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 135 days.

(21) Appl. No.: 17/255,062

(22) PCT Filed: Jun. 5, 2019

(86) PCT No.: PCT/JP2019/022343
§ 371 (c)(1),
(2) Date: Dec. 22, 2020

(87) PCT Pub. No.: WO2020/003939
PCT Pub. Date: Jan. 2, 2020

(65) Prior Publication Data
US 2021/0134005 A1    May 6, 2021

(30) Foreign Application Priority Data
Jun. 29, 2018    (JP) .............................. JP2018-124864

(51) Int. Cl.
*G06T 7/73*    (2017.01)
*G03B 15/00*    (2021.01)
(Continued)

(52) U.S. Cl.
CPC .............. *G06T 7/73* (2017.01); *G03B 15/006* (2013.01); *G03B 17/56* (2013.01); *G06T 7/20* (2013.01);
(Continued)

(58) Field of Classification Search
CPC .... G06V 20/17; G06V 20/58; G06V 2201/07; G06T 7/70; G06T 7/73;
(Continued)

(56) References Cited

U.S. PATENT DOCUMENTS

2020/0097028 A1    3/2020    Axmon et al. ........... G05D 1/12

FOREIGN PATENT DOCUMENTS

JP    2007212229 A    8/2007
JP    200848119 A    2/2008
(Continued)

OTHER PUBLICATIONS

Tomihiko Yoshida et al., A Study of Configurations and Control Methods for a High Accuracy Auto-Tracking Antenna, IEICE Technical Report, Apr. 24, 2003, pp. 19-24.
(Continued)

*Primary Examiner* — Andrew W Johns

(57) ABSTRACT

A control device mounted in a first mobile body that includes a camera and an antenna includes: the camera configured to operate such that a direction of an optical axis of the camera and an oriented direction of the antenna are linked to each other; an identification unit configured to identify a second mobile body through image recognition from a captured image captured by the camera operating; and an antenna control unit configured to control the oriented direction of the antenna such that a position of the identified second mobile body in the captured image is a predetermined position.

9 Claims, 9 Drawing Sheets

(51) Int. Cl.
  *G03B 17/56* (2021.01)
  *G06T 7/20* (2017.01)
  *H04B 7/08* (2006.01)
  *H04B 7/10* (2017.01)
(52) U.S. Cl.
  CPC ............... *H04B 7/08* (2013.01); *H04B 7/10* (2013.01); *G06T 2207/30244* (2013.01)
(58) Field of Classification Search
  CPC ........ G06T 2207/30244; G03B 15/006; H04B 7/08; H04B 7/10; H04B 7/26; H04B 17/27
  See application file for complete search history.

(56) References Cited

FOREIGN PATENT DOCUMENTS

| JP | 2011151722 A | 8/2011 | | |
|---|---|---|---|---|
| WO | WO-2018/011810 A1 | * | 1/2018 | ............. G01S 19/53 |
| WO | WO-2018114003 A1 | | 6/2018 | |

OTHER PUBLICATIONS

Junichi Higaki and Makio Tsuchiya, Design of Isolation Mechanism and Control Tracking for Satellite in Maritime Broadband Antenna System, IEICE Technical Report, Dec. 1, 2008, pp. 1578-1586.
Yoshinobu Kikuma, Adaptive antenna technology, Adaptive antenna technology, Oct. 10, 2003.

* cited by examiner

CONTROL APPARATUS, CONTROL SYSTEM AND CONTROL METHOD

CROSS-REFERENCE TO RELATED APPLICATIONS

This application is a 371 U.S. National Phase of International Application No. PCT/JP2019/022343, filed on Jun. 5, 2019, which claims priority to Japanese Application No. 2018-124864 filed on Jun. 29, 2018. The entire disclosures of the above applications are incorporated herein by reference.

TECHNICAL FIELD

The present invention relates to a control device, a control system, and a control method.

BACKGROUND ART

In recent years, in the field of radio communication, in addition to communication between a fixed station and a fixed station and communication between a mobile station and a base station, communication between a mobile station and a base station having the mobile station as a relay station, and communication between mobile stations (Machine-to-Machine (M2M)) have attracted attention. For the communication described above, a radio communication system based on The institute of Electrical and Electronics Engineers, Inc. (IEEE) 802.11 standards, for example, indicated by Wi-Fi and a radio communication system of a cellular type, for example, Long Term Evolution (LTE (registered trademark)) and the like are generally used.

However, in a case that large-capacity transmission is performed such that a total throughput number is equal to or higher than 100 Mbps with a relatively wide range of movements, the radio communication systems described above may not be appropriate. The reason for this is that power received by a radio station attenuates further as a distance between radio stations becomes longer, and a desired Carrier to Noise Ratio (C/N ratio) is not obtained.

In order to perform data communication at a higher speed with a desired C/N ratio, an antenna having a higher gain is necessary. Generally, a high-gain antenna is an antenna that has a large opening diameter, and thus, the width of a main beam becomes narrow. As a result, the position of a mobile station may easily deviate from the oriented direction of the antenna with the movement of the mobile station. For this reason, a tracking mechanism for tracking the mobile station is necessary.

In the related art, such a tracking mechanism, for example, is frequently used in communication in satellite-to-mobile stations (earth stations) requiring high gain antennas. In satellite communications systems, a satellite and earth stations are in one-to-multiple communication. For this reason, satellites orient antennas in directions toward the Earth's surface through attitude control. Thus, the tracking mechanism as described above is not used on the satellite side.

On the other hand, each earth station needs to orient antennas in a direction toward the satellite. Fax this reason, an earth station detects its own position using a Global Navigation Satellite System (GNSS), for example, a Global Positioning System (GPS), a Global Navigation Satellite System (GLONASS), or the like or various sensors such as a gyro sensor. Then, the earth station orients a main beam in a direction toward a satellite that is calculated based on the position of the earth station and the position of the satellite registered in a database or the like in advance. An earth station captures a satellite, for example, by a method of mechanical tracking using conical scanning or the like (for example, see Non Patent Literature 1 and 2) or a method of electronic tracking using an array antenna or the like (for example, see Non Patent Literature 3).

In this way, the satellite communication system is only required to have a tracking mechanism on the earth station side. In contrast to this, in communication between mobile stations (for example, communication between drones), both mobile stations need to acquire a mutual relative positional relation. For this reason, in the related art, for example, a certain configuration for improving a required accuracy of a tracking mechanism, such as an arrangement of tracking mechanisms in both mobile stations, needs to be provided.

CITATION LIST

Non Patent Literature

Non Patent Literature 1: Tomihiko Yoshida et al., "A Study of Configurations and Control Methods for a High Accuracy Auto-Tracking Antenna", IEICE Technical Report A P2003-4 SAT2003-4, pp. 19-24, The Institute of Electronics, Information and Communication Engineers, 2003

Non Patent Literature 2: Junichi Higaki et al., "Design of Isolation Mechanism and Control Tracking for Satellite in Maritime Broadband Antenna System", The IEICE Transactions on Communications B Vol, J91-B No. 12, pp. 1578-1586, The Institute of Electronics, Information and Communication Engineers, 2008

Non Patent Literature 3: Nobuyoshi Kikuma, "Adaptive Antenna Technology", pp. 122-124, Ohmsha, Ltd., 2003

SUMMARY OF THE INVENTION

Technical Problem

For example, in a radio communication system such as a radio communication system based on IEEE 802.11 standards or the like, time-division processing such as Time Division Multiple Access (TDMA) system is performed. For this reason, when only conical scanning or an array antenna as described above for performing tracking based on the reception state of a communication signal is used, a period in which a reception signal cannot be obtained, and thus a time lag may be generated. For this reason, in the related art, in a case that communication is performed using a radio communication system with a period in which a reception signal cannot be obtained, it is difficult to perform accurate tracking.

In view of the foregoing, an object of the present invention is to provide a technology enabling accurate tracking even in a case that communication is performed using a radio communication system with a period in which a reception signal cannot be obtained.

Means for Solving the Problem

One aspect of the present invention is a control device mounted in a first mobile body that includes a camera and an antenna, the control device including: an identification unit configured to identify a second mobile body through image recognition from a captured image captured by the camera operating such that a direction of an optical axis of the camera and an oriented direction of the antenna are linked to each other; and an antenna control unit configured to control the oriented direction of the antenna such that a position of the identified second mobile body in the captured image is a predetermined position.

In addition, one aspect of the present invention is the control device described above, further including a correction unit configured to calculate a direction of the second mobile body based on information relating to a electromagnetic wave received from the second mobile body and control the oriented direction of the antenna to match the calculated direction of the second mobile body.

In addition, one aspect of the present invention is the control device described above, further including: a position information transmission unit configured to transmit first position information indicating a position of the first mobile body to a server; and a relative positional relation information reception unit configured to receive, from the server, relative positional relation information indicating a relative positional relation between the position of the first mobile body and a position of the second mobile body, and the antenna control unit controls the oriented direction of the antenna to match a direction of the second mobile body that is calculated based on the relative positional relation information received by the relative positional relation information reception unit, In addition, one aspect of the present invention is the control device described above, in which the antenna control unit controls the oriented direction of the antenna to match a direction based on an area of which an index value indicating a reception state is highest among a plurality of areas forming the captured image.

In addition, one aspect of the present invention is a control system including: a control device mounted in a first mobile body that includes a camera and an antenna; and a server, wherein the control device includes: an identification unit configured to identify a second mobile body through image recognition from a captured image captured by the camera operating such that a direction of an optical axis of the camera and an oriented direction of the antenna are linked to each other; an antenna control unit configured to control the oriented direction of the antenna such that a position of the identified second mobile body in the captured image is a predetermined position; a position information transmission unit configured to transmit first position information indicating a position of the first mobile body to the server; and a relative positional relation information reception unit configured to receive, from the server, relative positional relation information indicating a relative positional relation between the position of the first mobile body and a position of the second mobile body, the server includes: a position information acquiring unit configured to acquire the first position information and second position information indicating the position of the second mobile body; a relative positional relation calculation processing unit configured to generate the relative positional relation information based on the first position information and the second position information; and a relative positional relation information transmission unit configured to transmit the relative positional relation information calculated by the relative positional relation calculation processing unit to the control device, and the antenna control unit controls the oriented direction of the antenna to match a direction of the second mobile body that is calculated based on the relative positional relation information received by the relative positional relation information reception unit.

Furthermore, one aspect of the present invention is a control system mounted in a first mobile body that includes a camera and an antenna, the control system including: an identification unit configured to identify a second mobile body through image recognition from a captured image captured by the camera operating such that a direction of an optical axis of the camera and an oriented direction of the antenna are linked to each other; an antenna control unit configured to control the oriented direction of the antenna such that a position of the identified second mobile body in the captured image is a predetermined position; and a reception state calculating unit configured to calculate an index value indicating a reception state of each of a plurality of areas forming the captured image based on a reception state of an electromagnetic wave transmitted from the second mobile body, wherein the antenna control unit controls the oriented direction of the antenna to match a direction based on an area of which the index value is highest.

In addition, one aspect of the present invention is a control method using a computer mounted in a first mobile body that includes a camera and an antenna, the control method including: identifying a second mobile body through image recognition from a captured image captured by the camera operating such that a direction of an optical axis of the camera and an oriented direction of the antenna are linked to each other; controlling the oriented direction of the antenna such that a position of the identified second mobile body in the captured image is a predetermined position; acquiring first position information indicating a position of the first mobile body and second position information indicating a position of the second mobile body; generating relative positional relation information indicating a relative positional relation between the first mobile body and the second mobile body based on the first position information and the second position information; and controlling the oriented direction of the antenna of the first mobile body to match a direction of the second mobile body that is calculated based on the relative positional relation information.

Furthermore, one aspect of the present invention is a control method using a computer mounted in a first mobile body that includes a camera and an antenna the control method including: identifying a second mobile body through image recognition from a captured image captured by the camera operating such that a direction of an optical axis of the camera and an oriented direction of the antenna are linked to the antenna; controlling the oriented direction of the antenna such that a position of the identified second mobile body in the captured image is a predetermined position; calculating an index value indicating a reception state of each of a plurality of areas forming the captured image based on a reception state of an electromagnetic wave transmitted from the second mobile body; and controlling the oriented direction of the antenna of the first mobile body to match a direction based on an area of which the index value is highest.

Effects of the Invention

According to the present invention, accurate tracking can be performed even in a case that communication is performed using a radio communication system with a period in which a reception signal cannot be obtained.

DESCRIPTION OF EMBODIMENTS

Hereinafter, an embodiment according to the present invention will be described. In each embodiment described below, a mobile station in radio communication between a mobile station and a mobile station (for example, drone-to-drone) will be described as an example.

First Embodiment

Hereinafter, a mobile station 10a, according to a first embodiment of the present invention will be described with reference to the drawings.

Configuration of Mobile Station

Figure 1:
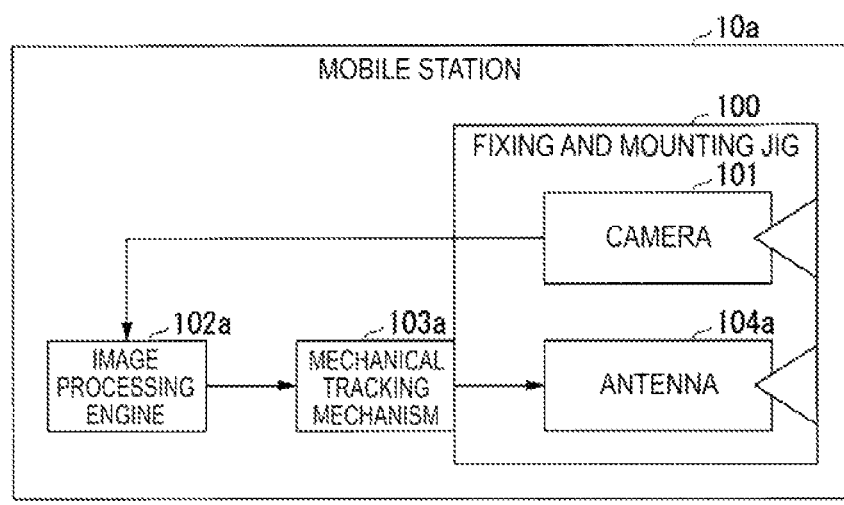
FIG. 1 is a block diagram illustrating the configuration of a mobile station 10a according to a first embodiment of the present invention.

Hereinafter, the configuration of the mobile station 10a will be described. FIG. 1 is a block diagram illustrating the configuration of the mobile station 10a according to the first embodiment of the present invention.

As illustrated in FIG. 1, the mobile station 10a includes a camera 101, an image processing engine 102a, a mechanical tracking mechanism 103a, an antenna 104a, and a fixing and mounting jig 100.

The fixing and mounting jig 100 is a member that is used for fixing the camera 101 and the antenna 104a to the mechanical tracking mechanism 103a. Thus, in accordance with an operation of the mechanical tracking mechanism 103a, the orientation of the camera 101 (the direction of an optical axis of a lens) and the orientation of the antenna 104a (the oriented direction of the antenna) change.

Both the camera 101 and the antenna 104a are attached to the fixing and mounting jig 100 such that a direction (an azimuth and an elevation angle) of the optical axis of the lens of the camera 101 and an emission direction (in other words, an oriented direction) of a beam of electromagnetic waves emitted from the antenna 104a match. As a result, the beam of electromagnetic waves is emitted from the antenna 104a toward a position shown at the center of an image captured by the camera 101.

As described above, the camera 101 and the antenna 104a are configured to be fixed using the fixing and mounting jig 100 in the embodiment, but the configuration is not limited thereto. For example, the camera 101 and antenna 104a may be configured to be independently operable without being fixed. However, in such a case, the orientation of the camera 101 and the orientation of the antenna 104a can change independently. Therefore, it is necessary to cause the direction of the optical axis of the lens of the camera 101 and the orientated direction of the antenna 104 to match, for example, additionally using a computation engine for correction.

The camera 101 performs imaging in a direction in which a mobile station (for example, a drone that is a communication partner) on an opposite side to be tracked is present. The camera 101 outputs image data representing the captured image to the image processing engine 102a.

The image processing engine 102a analyzes an image based on the image data input from the camera 101. The image processing engine 102a identifies a mobile station on the opposite side that is shown in the image. Then, the image processing engine 102a identifies an image area representing the mobile station on the opposite side in the image based on the image data.

The image processing engine 102a, for example, may store image data (master image data) indicating an image in which the mobile station on the opposite side is captured in advance and identify an image area representing the mobile station on the opposite side inside the image by collating the master image data with image data input from the camera 101.

The image processing engine 102a operates the mechanical tracking mechanism 103a such that an image area representing the mobile station on the opposite side, which has been identified, is located at a predetermined position (for example, a central position) of the image based on the image data input from the camera 101. As a result, the mobile station on the opposite side can be tracked using the antenna 104a.

For example, in a case that an image area representing the mobile station on the opposite side is positioned on a side above a predetermined position (for example, a central position) in an image based on image data input from the camera 101, the image processing engine 102a controls the mechanical tracking mechanism 103a to direct the imaging direction of the camera 101 upward. For example, in a case that an image area representing the mobile station on the opposite side is positioned further to the left side than a predetermined position (for example, a central position) in the image based on image data input from the camera 101, the image processing engine 102a controls the mechanical tracking mechanism 104a to direct the imaging direction of the camera 101 toward a left side.

As described above, the mobile station 10a is configured to control the orientation of the camera 101 using the mechanical tracking mechanism 103a in this embodiment, but the configuration is not limited thereto.

For example, the mobile station 10a may be configured to control the orientation of the camera 101 using an electronically-controlled tracking mechanism (for example, a mechanism that performs tracking through electronic control using an array antenna).

In addition, the camera 101 and the image processing engine 102a may configured to be provided as external devices connected to the mobile station 10a instead of being provided inside a casing of the mobile station 10a.

Operation of Mobile Station

Figure 2:
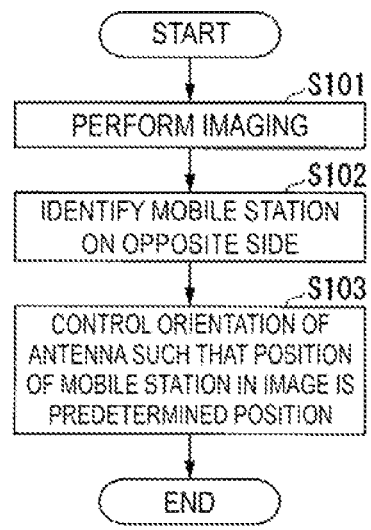
FIG. 2 is a flowchart illustrating an operation of the mobile station 10a according to the first embodiment of the present invention.

Hereinafter, an example of an operation of the mobile station 10a will be described. FIG. 2 is a flowchart illustrating the operation of the mobile station 10a according to the first embodiment of the present invention.

The camera 101 performs imaging in a direction in which a mobile station on an opposite side to be tracked is present (step S101). The camera 101 outputs image data representing the captured image to the image processing engine 102a.

The image processing engine 102a analyzes an image based on the image data input from the camera 101. The image processing engine 102a identifies a mobile station on the opposite side that is shown in the image (step S102). Then, the image processing engine 102a identifies an image area representing the mobile station on the opposite side in the image based on the image data.

The image processing, engine 102a controls the oriented direction of the antenna 104a such that the position of the mobile station on the opposite side, which has been identified, (in other words, the image area representing the mobile station on the opposite side) becomes a predetermined position (for example, a central position) of the image based on the image data input from the camera 101 (step S103).

As described above, the image processing engine 102a controls the oriented direction of the antenna 104a by operating the mechanical tracking mechanism 103a. Thus, the processing illustrated in the flowchart of FIG. 2 ends.

Second Embodiment

Hereinafter, a mobile station 10b according to a second embodiment of the present invention will be described with reference to the drawings.

A main difference between the configuration of the mobile station 10b according to the second embodiment described below and the configuration of the mobile station 10a according to the first embodiment described above is that the mobile station 10b according to the second embodiment further includes an electronic tracking mechanism.

Generally, it is difficult to precisely match the direction of the optical axis of the lens of the camera with the oriented direction of the antenna. For this reason, in a case that a mobile station on the opposite side is tracked based on the position of the mobile station on the opposite side in the image captured by the camera, there may actually be a slight error between the direction of the mobile station on the opposite side and the oriented direction of the antenna. In addition, a slight error may also occur due to a restriction associated with a control resolution of the mechanical tracking mechanism.

Thus, the mobile station 10b according to the second embodiment, first, performs control (rough adjustment) of the oriented direction of the antenna (an array antenna 105 described below) using a mechanical tracking mechanism similar to the mobile station 10a according to the first embodiment described above. Thereafter, the mobile station 10b further performs correction (fine adjustment) of the control of the oriented direction of the array antenna 105 using an electronic tracking mechanism (a phase control mechanism).

Here, the fine adjustment of control of the oriented direction of the antenna is performed by calculating an arrival direction of electromagnetic waves transmitted from the mobile station on the opposite side from information of a propagation path matrix or the like calculated from power information or phase information that can be obtained from the electromagnetic waves received from the mobile station on the opposite side, for example, using the array antenna 105.

Configuration of Mobile Station

Figure 3:
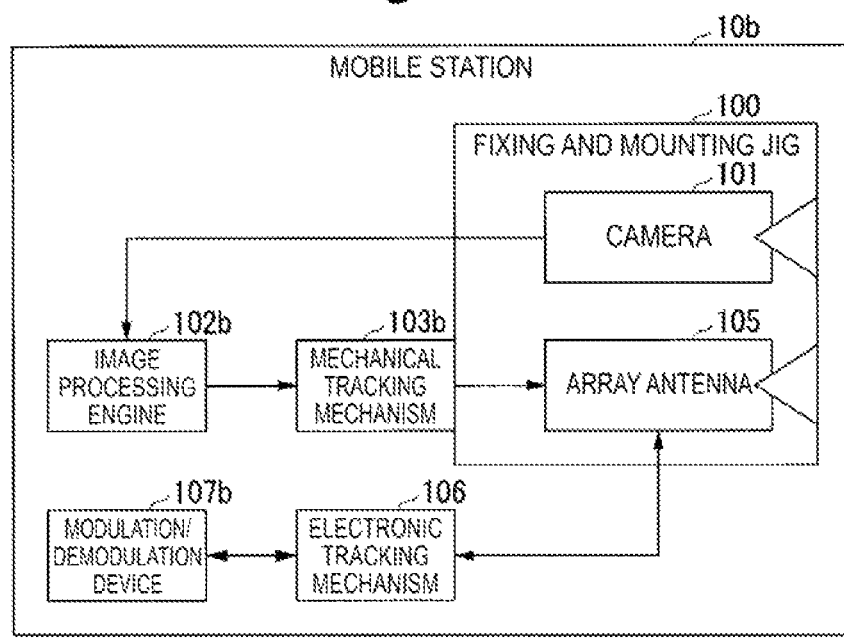
FIG. 3 is a block diagram illustrating the configuration of a mobile station 10b according to a second embodiment of the present invention.

Hereinafter, the configuration of the mobile station 10b will be described. FIG. 3 is a block diagram illustrating the configuration of the mobile station 10b according to the second embodiment of the present invention.

As illustrated in FIG. 3, the mobile station 10b is configured to include a camera 101, an image processing engine 102b, a mechanical tracking mechanism 103b, an array antenna 105, an electronic tracking mechanism 106, a modulation/demodulation device 107b, and a fixing and mounting jig 100.

The fixing and mounting jig 100 is a member that is used for fixing the camera 101 and the array antenna 105 to the mechanical tracking mechanism 103b. Thus, in accordance with an operation of the mechanical tracking mechanism 103b, the oriented directions of the camera 101 and the array antenna 105 change.

Both the camera 101 and the array antenna 105 are attached to the fixing and mounting jig 100 such that a direction of the optical axis of the lens of the camera 101 and an oriented direction of the array antenna 105 match. As a result, the beam of electromagnetic waves is emitted from the array antenna 105 toward a position shown at the center of an image captured by the camera 101. However, as described above, an error may occur between the direction (an azimuth and an elevation angle) of the optical axis of the lens of the camera 101 and the oriented direction of the array antenna 105.

The camera 101 performs imaging in a direction in which a mobile station (for example, a drone that is a communication partner) on an opposite side to be tracked is present. The camera. 101 outputs image data representing a captured image to the image processing engine 102b.

The image processing engine 102b analyzes an image based on image data input from the camera 101. The image processing engine 102b identifies a mobile station on the opposite side that is shown in the image. Then, the image processing engine 102b identifies an image area representing the mobile station on the opposite side in the image based on the image data, The image processing engine 102b operates the mechanical tracking mechanism 103b such that an image area representing the mobile station on the opposite side, which has been identified, is located at a predetermined position (for example, a central position) of the image based on the image data input from the camera 101. As a result, coarse adjustment of tracking of the mobile station on the opposite side using the array antenna 105 is performed by the mechanical tracking mechanism 103b.

The array antenna 105 receives electromagnetic waves emitted from the mobile station on the opposite side.

The electronic tracking mechanism 106 acquires information of the propagation path matrix and the like calculated from power information or phase information relating to the electromagnetic waves received by the array antenna 105 from the modulation/demodulation device 107b. The electronic tracking mechanism 106 calculates an arrival direction of the electromagnetic waves transmitted from the mobile station on the opposite side using such information that has been acquired.

Then, the electronic tracking mechanism 106 controls the array antenna 105 such that the oriented direction of the array antenna 105 matches the arrival direction of the electromagnetic waves transmitted from the mobile station on the opposite side. As a result, fine adjustment of the tracking of the mobile station on the opposite side using the array antenna 105 is performed by the electronic tracking mechanism 106.

Operation of Mobile Station

Figure 4:
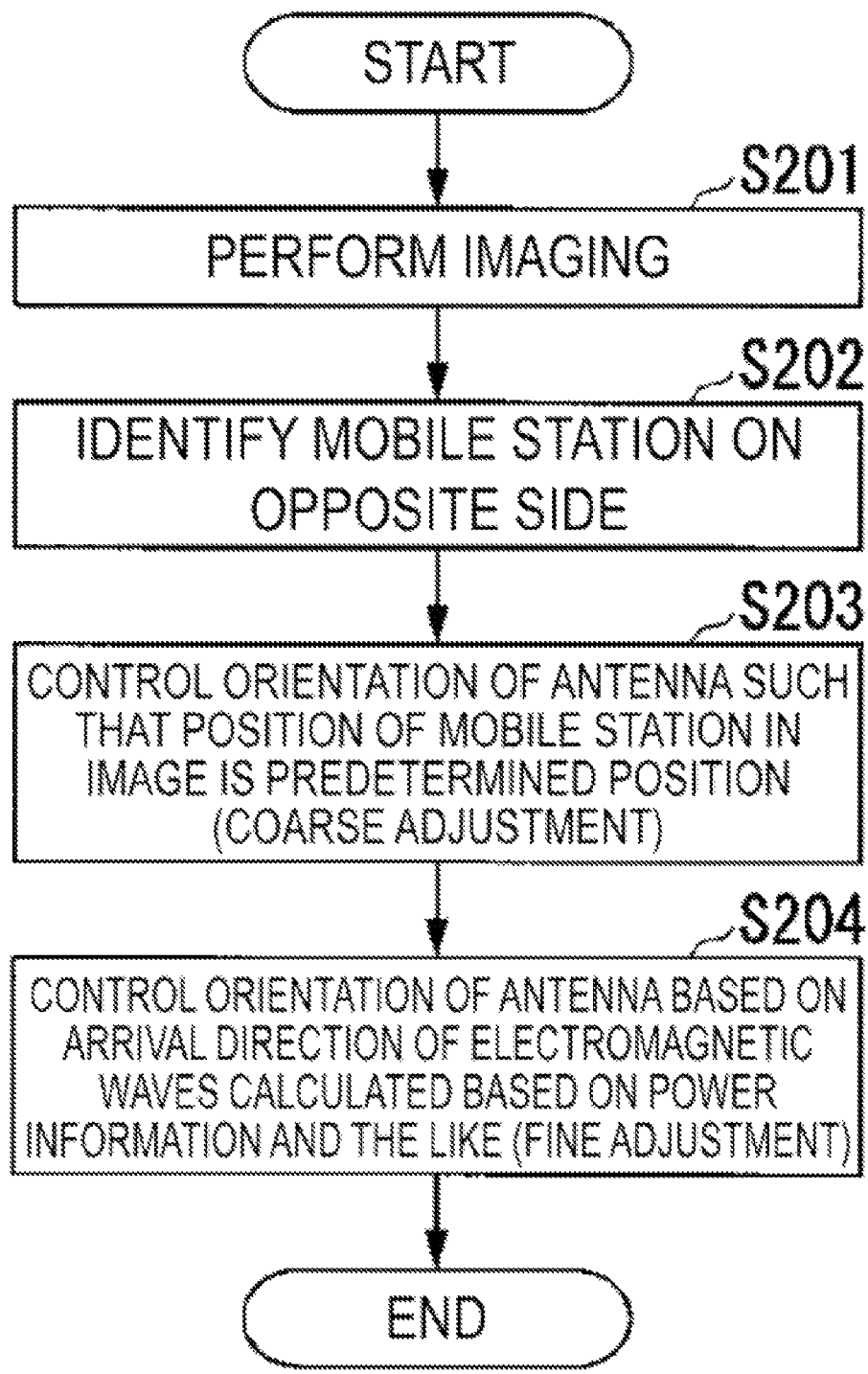
FIG. 4 is a flowchart illustrating an operation of the mobile station 10b according to the second embodiment of the present invention.

Hereinafter, an example of an operation of the mobile station 10b will be described. FIG. 4 is a flowchart illustrating an operation of the mobile station 10b according to the second embodiment of the present invention.

The camera 101 performs imaging in a direction in which a mobile station on an opposite side to be tracked is present (step S201). The camera 101 outputs image data representing a captured image to the image processing engine 102b.

The image processing engine 102b analyzes images based on image data input from the camera 101. The image processing engine 102b identifies a mobile station on the opposite side that is shown in the image (step S202). Then, the image processing engine 102b identifies an image area representing the mobile station on the opposite side in the image based on the image data.

The image processing engine 102b performs control to coarsely adjust the oriented direction of the array antenna 105 such that the position of the mobile station on the opposite side that has been identified (in other words, an image area representing the mobile station on the opposite side) is a predetermined position (for example, a central position) of the image based on the image data input from the camera 101 (step S203).

In addition, the image processing engine 102b performs control to coarsely adjust the oriented direction of the array antenna 105 by operating the mechanical tracking mechanism 103b.

The electronic tracking mechanism 106 acquires information of a propagation path matrix and the like calculated from power information or phase information relating to the electromagnetic waves received by the array antenna 105. The electronic tracking mechanism 106 calculates an arrival direction of the electromagnetic waves transmitted from the mobile station on the opposite side using such information that has been acquired. Then, the electronic tracking mechanism 106 performs control for fine adjustment of the oriented direction of the array antenna 105 such that the oriented direction matches the calculated arrival direction (step S204). Thus, the processing illustrated in the flowchart of FIG. 4 ends.

Modified Example of Second Embodiment

Hereinafter, a mobile station 10c according to a modified example of the second embodiment of the present invention will be described with reference to the drawings.

The mobile station 10b according to the second embodiment described above is configured to coarsely adjust the oriented direction of the antenna (the array antenna 105) by the mechanical tracking mechanism 103b, and then finely adjust the oriented direction by the electronic tracking mechanism 106. However, as in the mobile station 10c according to the modified example of the second embodiment described below, not only the coarse adjustment, but also the fine adjustment of the oriented direction of the antenna may be configured to be performed using the mechanical tracking mechanism 103b.

Configuration of Mobile Station

Figure 5:
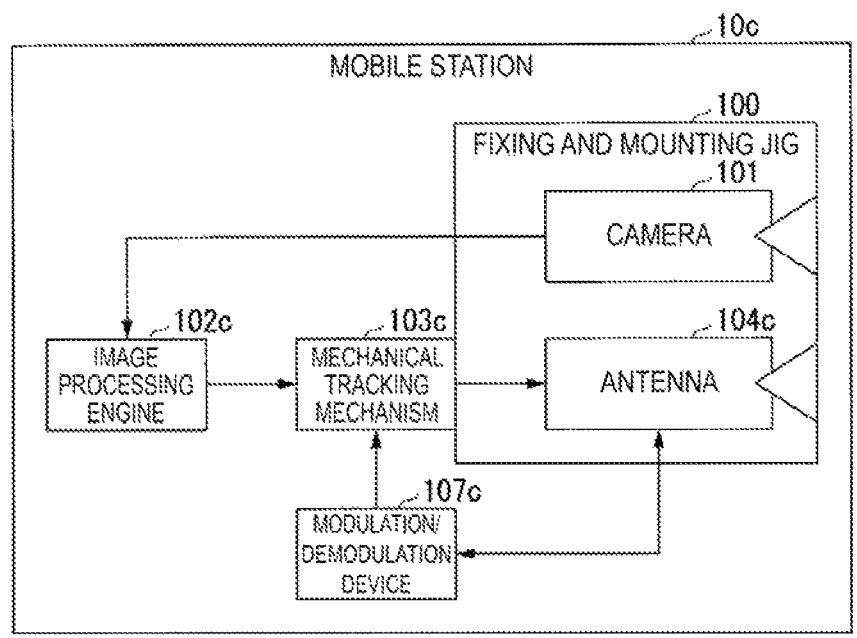
FIG. 5 is a block diagram illustrating the configuration of a mobile station 10c according to a modified example of the second embodiment of the present invention.

Hereinafter, the configuration of the mobile station 10c will be described. FIG. 5 is a block diagram illustrating the configuration of the mobile station 10c according to the modified example of the second embodiment of the present invention. As illustrated in FIG. 4, the mobile station 10c is configured to include a camera 101, an image processing engine 102c, a mechanical tracking mechanism 103c, an antenna 104c, a modulation/demodulation device 107c, and a fixing and mounting jig 100.

Configurations relating to imaging using the camera 101, image processing using the image processing engine 102c, coarse adjustment of the oriented direction of the antenna using the mechanical tracking mechanism 103c, and fixing of the camera 101 and the antenna using the fixing and mounting jig 100 of the mobile station 10c are the same as those of the mobile station 10b according to the second embodiment described above, and thus, hereinafter, description thereof will be omitted.

The antenna 104c receives electromagnetic waves emitted from the mobile station on the opposite side.

The mechanical tracking mechanism 103c acquires information indicating a reception state of electromagnetic waves received by the antenna 104c from the modulation/demodulation device 107c. Then, the mechanical tracking mechanism 103c controls the oriented direction of the antenna 104c such that a value indicated by the acquired information indicating the reception state is optimum. For example, the mechanical tracking mechanism 103c acquires a value of a reception level of the electromagnetic waves received by the antenna 104c from the modulation/demodulation device 107c and controls the oriented direction of the antenna 104c such that the acquired value of the reception level becomes maximum. As a result, not only the coarse adjustment, but also the fine adjustment of tracking of the mobile station on the opposite side by the antenna 104c is performed by the mechanical tracking mechanism 103c.

Third Embodiment

Hereinafter, a mobile station control system 1 according to a third embodiment of the present invention will be described with reference to the drawings.

In order to identify the mobile station on the opposite side using an image captured by the camera, the mobile station on the opposite side is required to be shown in a size equal to or larger than a predetermined size and identifiable in the captured image. For this reason, in a case that a distance between a mobile station of interest and the mobile station on the opposite side is long, the camera generally includes a telephoto lens or the like. In a case that a telephoto lens is used, the captured image is an enlarged image with a smaller imaging range. For this reason, the mobile station on the opposite side is more likely to deviate from the imaging range, and the mobile station on the opposite side is more likely to be out of the image.

The mobile station control system 1 according to the third embodiment described below is configured to track a mobile station on the opposite side even in a case that the mobile station on the opposite side is not shown in the image such as a case of initial calibration or a case that the mobile station on the opposite side is out of the imaging range.

Configuration of Mobile Station Control System Hereinafter, the configuration of the mobile station control system 1 will be described.

Figure 6:
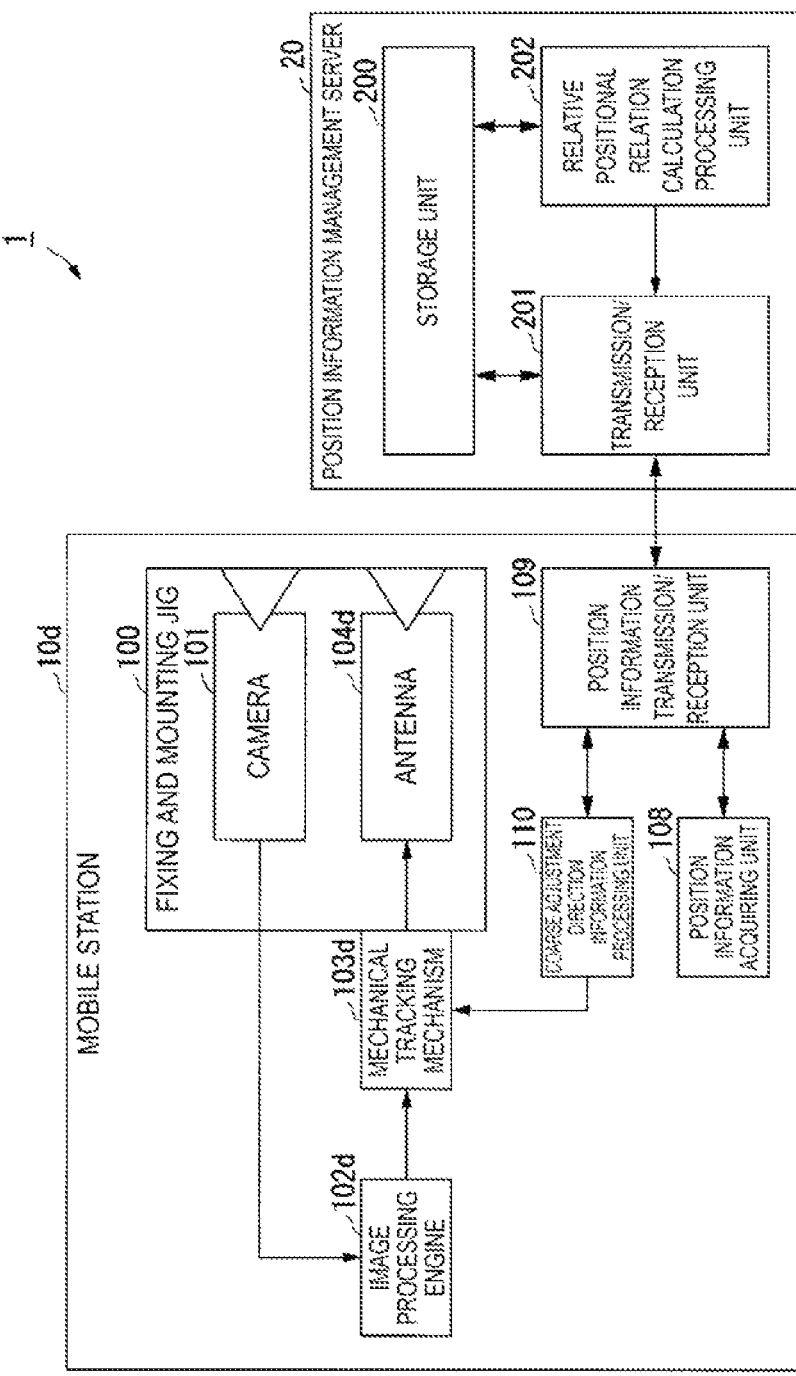
FIG. 6 is a block diagram illustrating the configuration of a mobile station control system 1 according to a third embodiment of the present invention.

FIG. 6 is a block diagram illustrating the configuration of the mobile station control system 1 according to the third embodiment of the present invention. As illustrated in FIG. 6, the mobile station control system 1 is configured to include a mobile station 10d and a position information management server 20. The mobile station 10d and the position information management server 20 are wirelessly communicatively connected.

Configuration of Mobile Station

Hereinafter, the configuration of the mobile station 10d will be described. As illustrated in FIG. 6, the mobile station 10d is configured to include a camera 101, an image processing engine 102d, a mechanical tracking mechanism 103d, an antenna 104d, a position information acquiring unit 108, a position information transmission/reception unit 109, a coarse adjustment direction information processing unit 110, and a fixing and mounting jig 100.

The position information acquiring unit 108 acquires position information indicating the position of a mobile station of interest 10d (a mobile station of interest). The position information acquiring unit 108 acquires position information indicating its own position, for example, using a GNSS such as a GPS, or a gyro sensor. Then, the position information acquiring unit 108 transmits the position information indicating its own position to the position information management server 20 through the position information transmission/reception unit 109 using radio communication.

The coarse adjustment direction information processing unit 110 acquires relative positional relation information from the position information management server 20 through the position information transmission/reception unit 109 using radio communication. The relative positional relation information is information that indicates a relative positional relation between a plurality of mobile stations with position information managed by the position information management server 20.

In addition, the coarse adjustment direction information processing unit 110 may be configured to acquire, from the position information management server 20, relative positional relation information indicating a relative positional relation between the mobile station of interest 10d and the mobile station on the opposite side. Alternatively, the coarse adjustment direction information processing unit 110 may be configured to acquire relative positional relation information indicating relative positional relations between the mobile station of interest 10d (the position information is managed by the position information management server 20) and all the other mobile stations from the position information management server 20.

Then, the coarse adjustment direction information processing unit 110 calculates the direction (an azimuth and an elevation angle) of the mobile station on the opposite side based on the acquired relative positional relation information. Then, the coarse adjustment direction information processing unit 110 controls the mechanical tracking mechanism 103d such that the calculated direction of the mobile station on the opposite side matches the direction of the optical axis of the lens of the camera 101 (and the oriented direction of the antenna 104d). As a result, the mechanical tracking mechanism 103d performs coarse adjustment of tracking of the mobile station on the opposite side using the antenna 104d.

The fixing and mounting jig 100 is a member that is used for fixing the camera 101 and the antenna 104d to the mechanical tracking mechanism 103d. Thus, the orientation of the camera 101 and the oriented direction of the antenna 104d change in accordance with the operation of the mechanical tracking mechanism. 103d.

In addition, both the camera 101 and the antenna 104d are attached to the fixing and mounting jig 100 such that the direction (an azimuth and an elevation angle) of the optical axis of the lens of the camera 101 matches the oriented direction (an azimuth and an elevation angle) of the antenna 104d, As a result, a beam is emitted toward a position that is shown at the center of the image captured by the camera 101.

The camera 101 performs imaging in a direction in which a mobile station (for example, a drone that is a communication partner) on an opposite side to be tracked is present. The camera 101 outputs image data representing the captured image to the image processing engine 102d.

The image processing engine 102d analyzes an image based on image data input from the camera 101. The image processing engine 102d identifies a mobile station on the opposite side that is shown in the image. Then, the image processing engine 102d identifies an image area that indicates the mobile station on the opposite side inside the image based on the image data.

The image processing engine 102d operates the mechanical tracking mechanism 103d such that an image area representing the identified mobile station on the opposite side is located at a predetermined position (for example, a central position) of the image based on the image data input from the camera 101. As a result, the mobile station on the opposite side can be tracked using the antenna 104d.

Configuration of Position Information Management Server

Hereinafter, the configuration of the position information management server 20 will be described. As illustrated in FIG. 6, the position information management server 20 is configured to include a storage unit 200, a transmission/reception unit 201, and a relative positional relation calculation processing unit 202.

The storage unit 200 stores position information indicating the position of each mobile station collected from each mobile station. In addition, the storage unit 200 stores relative positional relation information indicating a relative positional relation between two mobile stations which is calculated based on the position information indicating the position of each mobile station. The storage unit 200, for example, is configured to include a storage medium such as a magnetic disk or a semiconductor memory.

The transmission/reception unit 201 receives position information indicating the position of each mobile station that is transmitted from each mobile station. The position information received by the transmission/reception unit 201 is stored in the storage unit 200.

The relative positional relation calculation processing unit 202 calculates a relative positional relation between each mobile station based on the position information indicating the position of each mobile station stored in the storage unit 200. The relative positional relation calculation processing unit 202 generates relative positional relation information indicating a relative positional relation between each mobile station. Then, the relative positional relation calculation processing unit 202 stores the generated relative positional relation information in the storage unit 200. Alternatively, the relative positional relation calculation processing unit 202 transmits the generated relative positional relation information to each mobile station through the transmission/reception unit 201.

Operation of Mobile Station Control System

Figure 7:
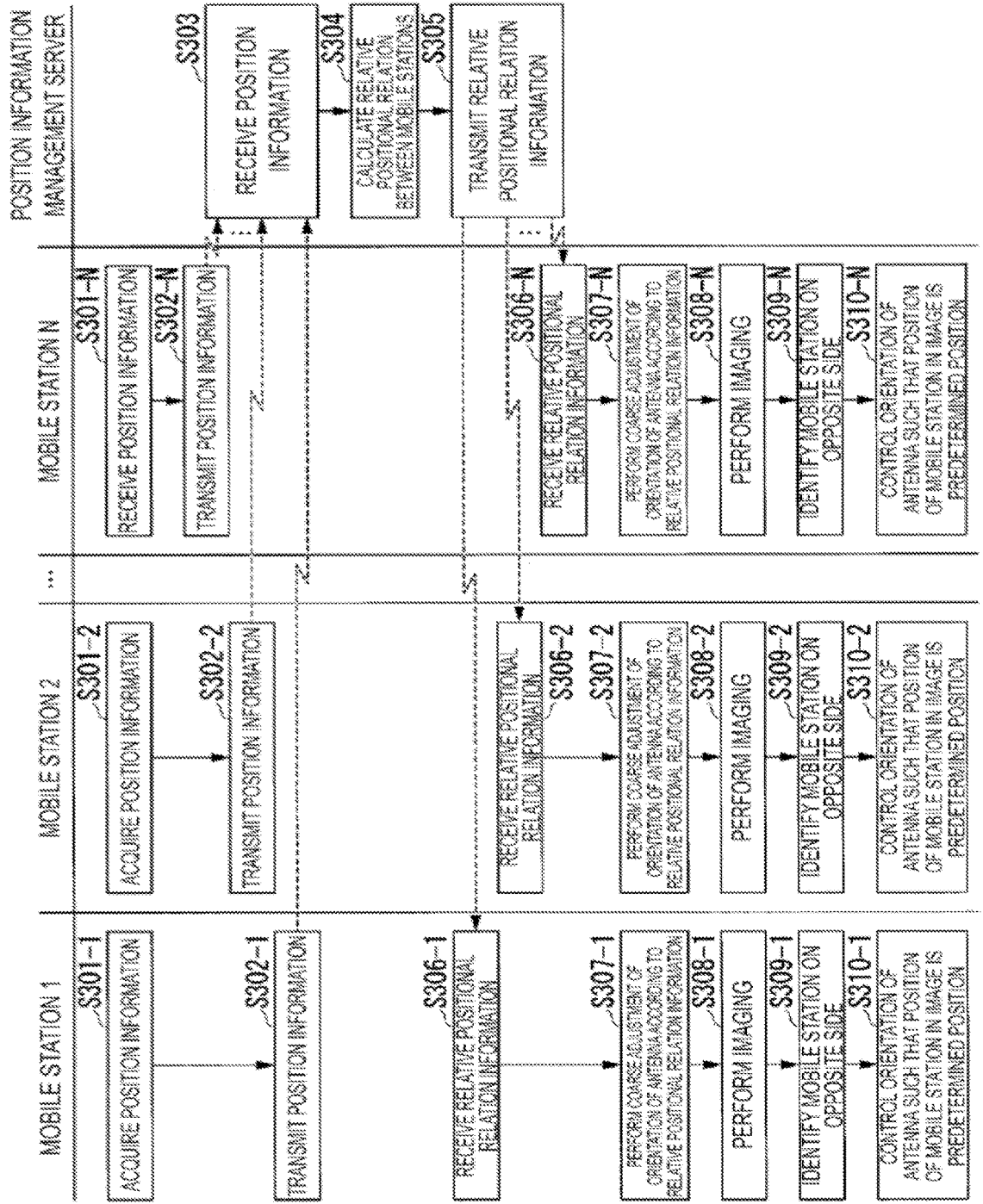
FIG. 7 is a flowchart illustrating an operation of the mobile station control system 1 according to the third embodiment of the present invention.

Hereinafter, an example of the operation of the mobile station control system 1 will be described. FIG. 7 is a flowchart illustrating the operation of the mobile station control system 1 according to the third embodiment of the present invention.

The position information acquiring unit 108 of each of mobile stations 10d (mobile station 1, mobile station 2, . . . , and mobile station N) acquires position information indicating the position of the mobile station of interest 10d (the mobile station of interest) (steps S301-1 to S301N).

The position information acquiring unit 108 of each mobile station 10d (the mobile station 1, the mobile station 2, ..., the mobile station N) wirelessly communicatively transmits the acquired position information indicating the position of the mobile station of interest to the position information management server 20 through the position information transmission/reception unit 109 (steps S302-1 to S302-N).

The transmission/reception unit 201 of the position information management server 20 receives the position information indicating the position of each mobile station that has been transmitted from each mobile station 10d (the mobile station I, the mobile station 2, ..., and the mobile station N) (step S303).

The relative positional relation calculation processing unit 202 of the position information management server 20 calculates a relative positional relation between each mobile station based on the position information indicating the position of each mobile station 10d (the mobile station 1, the mobile station 2, ..., and the mobile station N) (step S304). The relative positional relation calculation processing unit 202 generates relative positional relation information that indicates a relative positional relation between each mobile station based on results of the calculation described above.

The transmission/reception unit 201 of the position information management server 20 transmits the relative positional relation information to each mobile station 10d (the mobile station 1, the mobile station 2, ..., and the mobile station N) (step S305).

The position information transmission/reception unit 109 of each mobile station 10d (the mobile station 1, the mobile station 2, ..., and the mobile station N) receives the relative positional relation information transmitted from the position information management server 20 (steps S306-1 to S306-N).

The coarse adjustment direction information processing unit 110 of each mobile station 10d (the mobile station 1, the mobile station 2, ..., and the mobile station N) calculates a direction (an azimuth and an elevation angle) of the mobile station on the opposite side based on the relative positional relation information. Then, the coarse adjustment direction information processing unit 110 controls the mechanical tracking mechanism 103d such that the calculated direction of the mobile station on the opposite side matches the direction of the optical axis of the lens of the camera 101. As a result, coarse adjustment of the oriented direction of the antenna 104d is performed (steps S307-1 to S307-N).

The camera. 101 of each mobile station 10d. (the mobile station 1, the mobile station 2, ..., and the mobile station N) performs imaging in a direction of the mobile station on the opposite side to be tracked (steps S308-1 to S308-N). The camera 101 outputs image data representing the captured image to the image processing engine 102d.

The image processing engine 102d of each mobile station 10d (the mobile station 1, the mobile station 2, ..., and the mobile station N) analyzes the image based on the image data input from the camera 101. The image processing engine 102d identifies the mobile station on the opposite side shown in the image (steps S309-1 to S309-N). Then, the image processing engine 102d identifies an image area that indicates the mobile station on the opposite side inside the image based on the image data.

The image processing engine 102d of each mobile station 10d (the mobile station 1, the mobile station 2, ..., and the mobile station N) controls the oriented direction of the antenna 104d such that the position of the identified mobile station on the opposite side (in other words, an image area representing the mobile station on the opposite side) is located at a predetermined position (for example, a central position) of the image based on the image data input from the camera 101 (steps S310-1 to S310-N). Thus, the processing illustrated in the flowchart of FIG. 7 ends.

Fourth Embodiment

Hereinafter, a mobile station 10e according to a fourth embodiment of the present invention will be described with reference to the drawings.

As described above, generally, it is difficult to precisely match the direction of the optical axis of the lens of the camera with the oriented direction of the antenna. For this reason, in a case that a mobile station on the opposite side is tracked based on the position of the mobile station on the opposite side in the image captured by the camera, there may actually be a slight error between the direction in which the mobile station on the opposite side is actually present and the oriented direction of the antenna. In addition, a slight error may also occur due to a restriction associated with a control resolution of the mechanical tracking mechanism.

In addition, even when the mobile station 10d, as in the second embodiment described above, is configured to coarsely adjust the oriented direction of the antenna with the mechanical tracking mechanism by performing an image analysis, and subsequently finely adjust the oriented direction of the antenna with the electronic tracking mechanism (a phase control mechanism) using information acquired from a reception signal, the mobile station 10d may not be able to finely adjust the oriented direction of the antenna depending on a radio communication system used for communication between mobile stations. The reason for this is that time-division processing as in the TDMA system is performed depending on a radio communication system, and thus, fine adjustment of the oriented direction of the antenna cannot be performed while a mobile station of interest is performing a transmission processing.

Thus, the mobile station 10e according to the fourth embodiment described below divides an imaging area of an image captured by the camera 101 into a plurality of blocks. In addition, the mobile station 10e records a reception level of a reception signal received through the antenna 104e for each block in which the opposing station is present.

Figure 8:
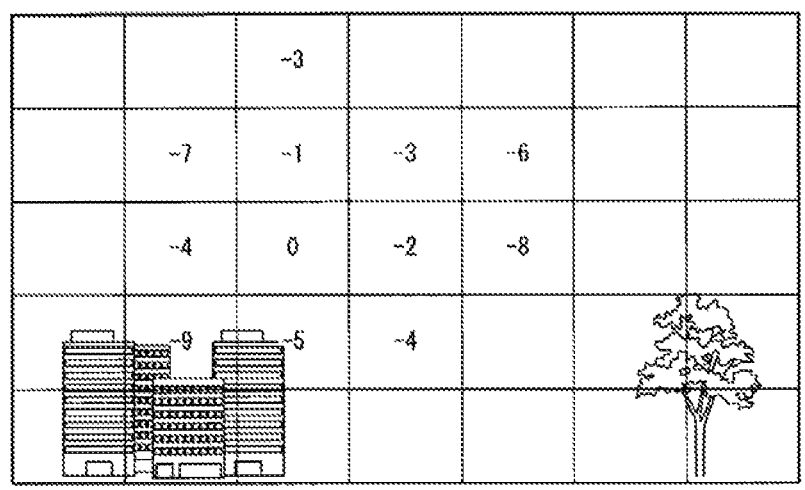
FIG. 8 is a schematic diagram illustrating an example of a reception level recording processing performed by a mobile station 10e according to a fourth embodiment of the present invention.

FIG. 8 is a schematic diagram illustrating an example of reception level recording processing performed by the mobile station 10e according to the fourth embodiment of the present invention. As illustrated in FIG. 8, the value of the reception level is recorded for each block (for example, a value recorded in the range of "−9" to "0" is the value of the reception level for each block in FIG. 8).

Then, after recording the reception levels a predetermined number of times, the mobile station 10e recognizes a position indicated by a block having a highest average value of the reception level as a position at which the mobile station on the opposite side is present.

In addition, the mobile station 10e may recognize a direction indicated by a block for which a maximum value is recorded among accumulated values of reception levels as a position at which the mobile station on the opposite side is present. In other words, the index value is not limited to an average value of the reception levels, and any index value can be used as long as the index value indicates a reception state.

The mobile station 100 controls the oriented direction (an azimuth and an elevation angle) of the antenna 104e such that the oriented direction of the antenna 104e matches the direction recognized as the position at which the mobile station on the opposite side is present described above.

In addition, the imaging information and an electromagnetic wave axis may not match depending on the position of the mobile station on the opposite side. For this reason, the mobile station 10e may be configured to record a reception level for each distance from the mobile station of interest to the mobile station on the opposite side. In such a case, the mobile station 10e, for example, can calculate a distance from the mobile station of interest to the mobile station on the opposite side from information indicating the relative positional relation between the mobile stations used by the mobile station 10d according to the third embodiment described above or information such as a size and the like of the mobile station on the opposite side on the image that can be obtained from the image.

Configuration of Mobile Station

Figure 9:
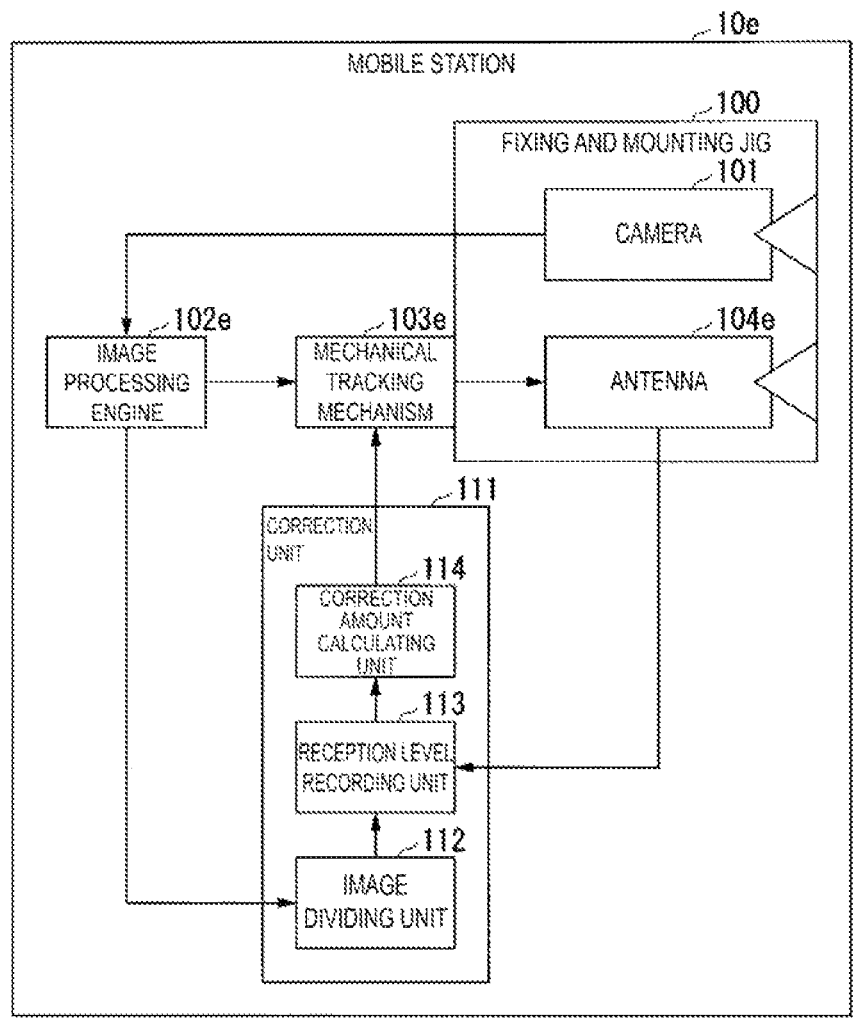
FIG. 9 is a block diagram illustrating the configuration of the mobile station 10e according to the fourth embodiment of the present invention.

Hereinafter, the configuration of the mobile station 10e will be described. FIG. 9 is a block diagram illustrating the configuration of the mobile station 10e according to the fourth embodiment of the present invention.

As illustrated in FIG. 9, the mobile station 10e is configured to include a camera 101, an image processing engine 102e, a mechanical tracking mechanism 103e, an antenna 104e, a fixing and mounting jig 100, and a correction unit 111. The correction unit 111 is configured to include an image dividing unit 112, a reception level recording unit 113, and a correction amount calculating unit 114.

The fixing and mounting jig 100 is a member that is used for fixing the camera 101 and the antenna 104e to the mechanical tracking mechanism 103e. Thus, in accordance with an operation of the mechanical tracking mechanism 103e, the orientation of the camera 101 and the oriented direction of the antenna 104e change.

In addition, both the camera 101 and the antenna 104e are attached to the fixing and mounting jig 100 such that the direction (an azimuth and an elevation angle) of the optical axis of the lens of the camera 101 matches the oriented direction (an azimuth and an elevation angle) of the antenna 104e. As a result, a beam is emitted toward a position that is shown at the center of the image captured by the camera 101. However, as described above, an error may occur between the direction (an azimuth and an elevation angle) of the optical axis of the lens of the camera 101 and the oriented direction (an azimuth and an elevation angle) of the antenna 104e.

The camera 101 performs imaging in a direction in which a mobile station (for example, a drone that is a communication partner) on an opposite side to be tracked is present. The camera. 101 outputs image data representing a captured image to the image processing engine 102e.

The image processing engine 102e analyzes an image based on image data input from the camera 101. The image processing engine 102e identifies a mobile station on the opposite side that is shown in the image. Then, the image processing engine 102e identifies an image area representing the mobile station on the opposite side in the image based on the image data.

The image processing engine 102e operates the mechanical tracking mechanism 103e such that an image area representing the mobile station on the opposite side, which has been identified, is located at a predetermined position (for example, a central position) of the image based on the image data input from the camera 101. As a result, coarse adjustment of the oriented direction of the antenna 104e for tracking the mobile station on the opposite side using the antenna 104e is performed.

The image processing engine 102e outputs image data input from the camera 101 and information indicating an image area of the image in which the mobile station on the opposite side is shown to the image dividing unit 112.

The image dividing unit 112 divides an image based on the image data input from the image processing engine 102e into a plurality of blocks as schematically illustrated in FIG. 8, for example. The image dividing unit 112 outputs the image data input from the image processing engine 102e, information relating to the divided blocks, and the information indicating the image area of the image in which the mobile station on the opposite side is shown to the reception level recording unit 113.

The reception level recording unit 113 identifies blocks in which the opposing station is present based on the image data, information relating to the blocks, and information indicating the image area of the image in which the mobile station on the opposite side is shown that have been input from the image dividing unit 112. Then, the reception level recording unit 113 records information (for example, a value of the reception level) indicating the reception state of the reception signal received from the antenna 104e for each block in which the opposing station is present.

Then, after recording reception levels a predetermined number of times, the reception level recording unit 113 outputs, to the correction amount calculating unit 114, information indicating a reception state of the reception signal for each block in which the opposing station is present (for example, the value of the reception level).

The correction amount calculating unit 114 recognizes a direction indicated by a block, in which a value based on the information indicating the reception state of the reception signal is the best, as a position at which the mobile station on the opposite side is present, on the basis of the information, indicating the reception state of the reception signal in each block in which the opposing station is present, which has been input from the reception level recording unit 113.

For example, the correction amount calculating unit 114 recognizes the direction indicated by a block, in which the average value of reception levels is largest, as a position at which the mobile station on the opposite side is present, on the basis of the value of the reception levels for each block, in which the opposing station is present, input from the reception level recording unit 113. The mobile station 10e may be configured to recognize a direction, indicated by a block in which a maximum value among accumulated values of reception levels is recorded, as a position at which the mobile station on the opposite side is present.

The correction amount calculating unit 114 controls the oriented direction (an azimuth and an elevation angle) of the antenna 104e by controlling the mechanical tracking mechanism 103e such that the oriented direction of the antenna 104e matches the direction recognized as the position at which the mobile station on the opposite side is present as described above.

Operation of Mobile Station

Figure 10:
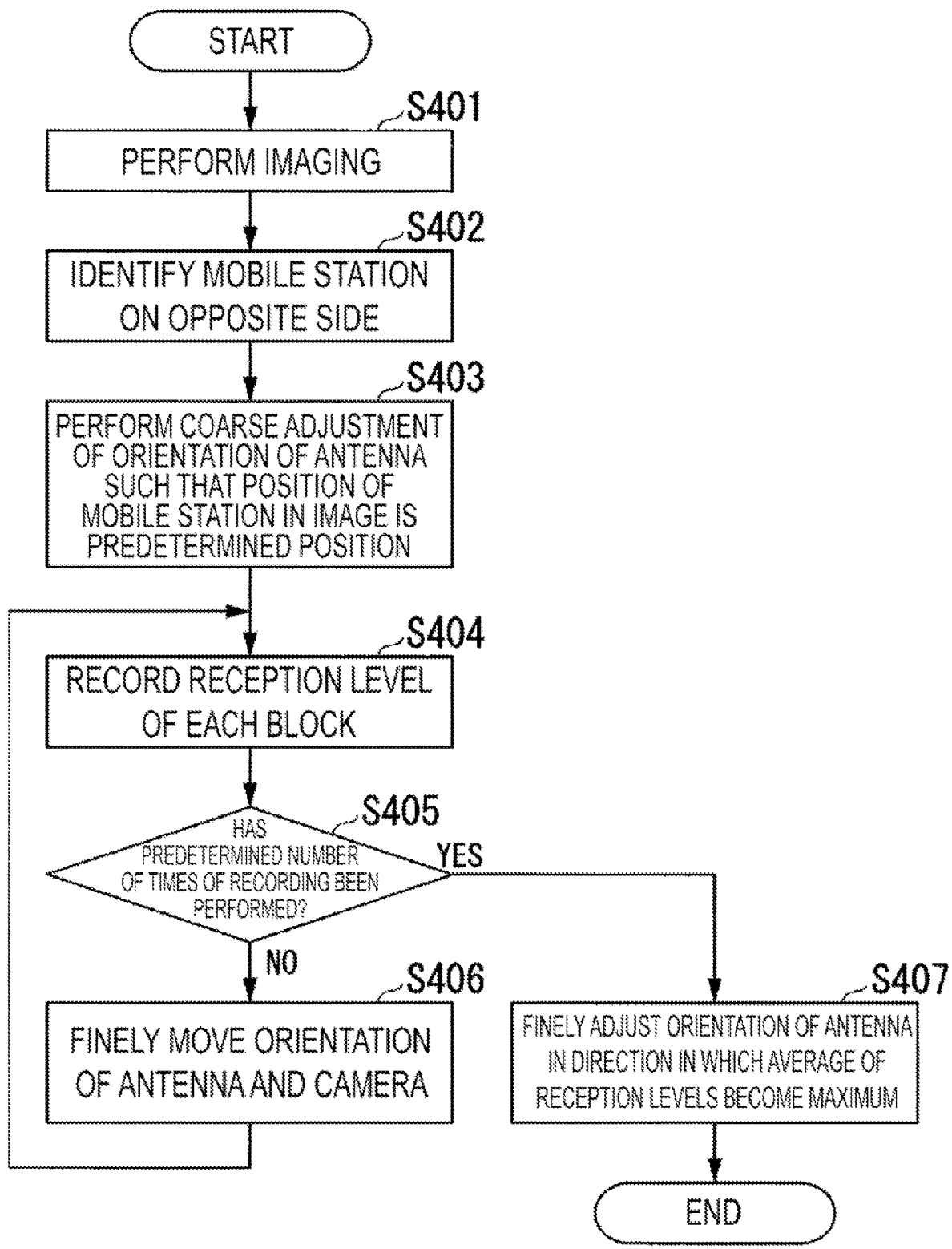
FIG. 10 is a flowchart illustrating an operation of the mobile station 10e according to the fourth embodiment of the present invention.

Hereinafter, an example of the operation of the mobile station 10e will be described. FIG. 10 is a flowchart illustrating an operation of the mobile station 10e according to the fourth embodiment of the present invention.

The camera 101 performs imaging in a direction in which a mobile station on an opposite side to be tracked is present (step S401), The camera 101 outputs image data representing a captured image to the image processing engine 102e.

The image processing engine 102e analyzes images based on image data input from the camera 101. The image processing engine 102e identifies a mobile station on the opposite side that is shown in the image (step S402). Then, the image processing engine 102e identifies an image area representing the mobile station on the opposite side in the image based on the image data.

The image processing engine 102e performs control to coarsely adjust the oriented direction of the antenna 104e such that the position of the mobile station on the opposite side that has been identified (in other words, an image area representing the mobile station on the opposite side) is a predetermined position (for example, a central position) of the image based on the image data input from the camera 101 (step S403).

In addition, as described above, the image processing engine 102e performs control to coarsely adjust the oriented direction of the antenna 104e by operating the mechanical tracking mechanism 103a.

The image dividing unit 112 divides an image into a plurality of blocks. The image dividing unit 112 outputs image data, information relating to divided blocks, and information indicating an image of the image area in which the mobile station on the opposite side is shown to the reception level recording unit 113. The reception level recording unit 113, for example, records a reception level of the reception signal received from the antenna 104e for each block in which a mobile station on the opposite side is present in the image (step S404).

The reception level recording unit 113 outputs information indicating the reception level of each block in which the opposing station is present to the correction amount calculating unit 114. In a case that a predetermined number of times of recording of a reception level is not performed (step S405: No), the correction amount calculating unit 114 controls the mechanical tracking mechanism 103e such that the oriented directions of the camera 101 and the antenna 104e slightly move (step S406), and the processing is returned to the processing of step S404.

On the other hand, in a case that a predetermined number of times of recording of a reception level is performed (step S405: Yes), the correction amount calculating unit 114 controls the mechanical tracking mechanism 103e such that the oriented direction of the antenna is finely adjusted to a direction corresponding to a block in which the average of recorded reception levels is maximum (step S407). Thus, the processing illustrated in the flowchart of FIG. 10 ends.

Each embodiment of the present invention has been described above. As described above, the mobile station 10a (a first mobile body) according to the first embodiment of the present invention includes the camera 101 and the antenna 104. In addition, the mobile station 10a includes the image processing engine 102a (an identification unit) configured to identify a mobile station (a second mobile body) on the opposite side through image recognition from a captured image captured by the camera 101 operating such that a direction of an optical axis of the camera 101 and an oriented direction of the antenna 104a are linked to each other. Furthermore, the mobile station 10a includes the mechanical tracking mechanism 103a (an antenna control omit) configured to control the oriented direction of the antenna 104a such that a position of the identified mobile station on the opposite side in the captured image is a predetermined position.

Furthermore, as described above, the mobile station 10b according to the second embodiment of the present invention further includes the electronic tracking mechanism 106 (a correction unit) configured to control the oriented direction of the array antenna 105 such that the array antenna 105 matches the direction of the mobile station on the opposite side that is calculated based on the information relating to electromagnetic waves received from the mobile station on the opposite side.

In addition, as described above, the mobile station control system 1 according to the third embodiment of the present invention includes the mobile station 10d (a first mobile body) including the camera 101 and the antenna 104d, and the position information management server 20 (server). The mobile station 10d described above includes the image processing engine 102d that identifies the mobile station on the opposite side through image recognition from the captured image captured by the camera 101 that operates such that the orientation of the optical axis of the camera 101 and the oriented direction of the antenna 104d are linked to each other. In addition, the mobile station control system 1 includes the mechanical tracking mechanism 103d that controls the oriented direction of the antenna such that the position in the captured image of the identified mobile station on the opposite side is a predetermined position. Furthermore, the mobile station control system 1 includes the position information transmission/reception unit 109 (a position information transmission unit and a relative positional relation information reception unit) that transmits position information (first position information) indicating the position of the mobile station of interest to the server and receives, from the position information management server 20, relative positional relation information indicating a relative positional relation between the position of the mobile station of interest and the position of the mobile station on the opposite side. The position information management server 20 described above includes the transmission/reception unit 201 (a position information acquiring unit) configured to acquire position information indicating the position of the mobile station of interest and position information (second position information) indicating a position of the mobile station on the opposite side. In addition, the position information management server 20 includes the relative positional relation calculation processing unit 202 configured to generate relative positional relation information based on position information indicating the position of the mobile station of interest and position information indicating the position of the mobile station on the opposite side. The transmission/reception unit 201 (the relative positional relation information transmission unit) transmits the relative positional relation information calculated by the relative positional relation calculation processing unit 202 to the mobile station 10d. The mechanical tracking mechanism 103d controls the oriented direction of the antenna 104d such that the oriented direction matches the direction of the mobile station on the opposite side calculated based on the relative positional relation information received by the position information transmission/reception unit 109.

As described above, the mobile station 10e according to the fourth embodiment of the present invention includes the camera 101 and the antenna 104e. In addition, the mobile station 10e includes the image processing engine 102e that identifies a mobile station on the opposite side through image recognition from the captured image captured by the camera 101 that operates such that the orientation of the optical axis of the camera 101 and the oriented direction of the antenna 104e are linked to each other. In addition, the mobile station 10e includes the mechanical tracking mechanism 103e that controls the oriented direction of the antenna 104e such that the position of the identified mobile station on the opposite side in the captured image is a predetermined position. Furthermore, the mobile station 10e includes the reception level recording unit 113 (a reception state calculating unit) configured to calculate an index value indicating a reception state of each of a plurality of areas forming the captured image based on a reception state of electromagnetic waves transmitted from the mobile station on the opposite side. In addition, the mechanical tracking mechanism 103e controls the oriented direction of the antenna 104e such that the index value matches a direction of an area having a highest index value.

By employing the configurations described above, the mobile stations (the mobile stations 10a, 10b, 10c, 10d, and 10e) and the mobile station control system 1 according to the above-described embodiments can perform accurate tracking even in a case that communication is performed using a radio communication system in which there is a period in which a reception signal cannot be acquired, for example, due to time-division processing and the like.

Although the embodiments of the present invention have been described above with reference to the drawings, it is clear that the above embodiments are merely examples of the present invention, and the present invention is not limited to the embodiments described above. Thus, addition, omission, substitution, and other modifications of the constituent components may be made without departing from the spirit and scope of the present invention.

Parts of the mobile stations (the mobile stations 10a, 10b, 10c, 10d, and 10e) and the mobile station control system 1 according to the embodiment described above may be achieved by a computer. In such a case, the above may be achieved by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a pail of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 Mobile station control system
10a, 10b, 10c, 10d, 10e Mobile station
20 Position information management server
100 Fixing and mounting jig
101 Camera
102a, 102b, 102c, 102d, 102e Image processing engine
103a, 103b, 103c, 103d, 103e Mechanical tracking mechanism
104a. 104c, 104d, 104e Antenna
105 Array antenna
106 Electronic tracking mechanism
107b, 107c Modulation/demodulation device
108 Position information acquiring unit
109 Position information transmission/reception unit
110 Coarse adjustment direction information processing unit
111 Correction unit
112 Image dividing unit
113 Reception level recording unit
114 Correction amount calculation unit
200 Storage unit
201 Transmission/reception unit
202 Relative positional relation calculation processing unit

The invention claimed is:

1. A control device mounted in a first mobile body that includes a camera and an antenna, the control device comprising:
   a processor; and
   a storage medium having computer program instructions stored thereon, when executed by the processor, perform to:
      control the camera and the antenna such that an optical axis of the camera and an oriented direction of the antenna are linked to each other;
      transmit first position information indicating a position of the first mobile body to a server;
      receive, from the server, relative positional relation information indicating a relative positional relation between the position of the first mobile body and a position of a second mobile body when the processor does not recognize existence of the second mobile body in a first captured image captured by the camera;
      control the oriented direction of the antenna to match a direction of the second mobile body that is calculated based on the relative positional relation information when the processor does not recognize the existence of the second mobile body in the first captured image;
      identify a position of the second mobile body through image recognition in a second captured image captured by the camera when the processor recognizes the existence of the second mobile body in the second captured image; and
      control the oriented direction of the antenna such that the identified position of the second mobile body in the second captured image is changed to a predetermined position when the processor recognizes the existence of the second mobile body in the second captured image.

2. The control device according to claim 1, wherein the computer program instructions further perform to calculate the direction of the second mobile body based on information relating to an electromagnetic wave received from the second mobile body and correct the oriented direction of the antenna to match the calculated direction of the second mobile body when the processor recognizes the existence of the second mobile body in the second captured image.

3. The control device according to claim 1,
wherein the computer program instructions further perform to:
divide the second captured image into a plurality of areas,
determine a reception state of the antenna with respect to each of the plurality of areas; and
control the oriented direction of the antenna to match a direction based on an area of which an index value indicating the reception state is highest among the plurality of areas.

4. A control system comprising:
a control device mounted in a first mobile body that includes a camera and an antenna;
a server configured to communicate with the control device and a second mobile body;
a processor; and
a storage medium having computer program instructions stored thereon, when executed by the processor, perform to:
control the camera and the antenna such that an optical axis of the camera and an oriented direction of the antenna are linked to each other;
transmit first position information indicating a position of the first mobile body to the server from the control device;
receive second position information indicating a position of the second mobile body by the server;
calculate relative positional relation information indicating a relative positional relation between the position of the first mobile body and the position of the second mobile body based on the first and second position information;
receive, by the control device from the server, the relative positional relation information when the processor does not recognize existence of the second mobile body in a first captured image captured by the camera;
control the oriented direction of the antenna to match a direction of the second mobile body that is calculated based on the relative positional relation information when the processor does not recognize the existence of the second mobile body in the first captured image;
identify a position of the second mobile body through image recognition in a second captured image captured by the camera when the processor recognizes the existence of the second mobile body in the second captured image; and
control the oriented direction of the antenna such that the identified position of the second mobile body in the second captured image is changed to a predetermined position when the processor recognizes the existence of the second mobile body in the second captured image.

5. The control system according to claim 4,
wherein the computer program instructions further perform to calculate the direction of the second mobile body based on information relating to an electromagnetic wave received from the second mobile body and correct the oriented direction of the antenna to match the calculated direction of the second mobile body when the processor recognizes the existence of the second mobile body in the second captured image.

6. The control system according to claim 4,
wherein the computer program instructions further perform to:
divide the second captured image into a plurality of areas;
determine a reception state of the antenna with respect to each of the plurality of areas; and
control the oriented direction of the antenna to match a direction based on an area of which an index value indicating the reception state is highest among the plurality of areas.

7. A control method using a computer mounted in a first mobile body that includes a camera and an antenna, the control method for causing a processor in the computer to execute a process, the control method comprising executing on the processor the steps of:
controlling the camera and the antenna such that an optical axis of the camera and an oriented direction of the antenna are linked to each other;
transmitting first position information indicating a position of the first mobile body to a server;
receiving, from a server, relative positional relation information indicating a relative positional relation between the position of the first mobile body and a position of a second mobile body when the processor does not recognize existence of the second mobile body in a first captured image captured by the camera;
controlling the oriented direction of the antenna to match a direction of the second mobile body that is calculated based on the relative positional relation information when the processor does not recognize the existence of the second mobile body in the first captured image;
identifying a position of the second mobile body through image recognition in a second captured image captured by the camera when the processor recognizes the existence of the second mobile body in the second captured image; and
controlling the oriented direction of the antenna such that the identified position of the second mobile body in the second captured image is changed to a predetermined position when the processor recognizes the existence of the second mobile body in the second captured image.

8. The control method according to claim 7,
wherein the processor is further configured to calculate the direction of the second mobile body based on information relating to an electromagnetic wave received from the second mobile body and correct the oriented direction of the antenna to match the calculated direction of the second mobile body when the processor recognizes the existence of the second mobile body in the second captured image.

9. The control method according to claim 7,
wherein the processor is further configured to:
divide the second captured image into a plurality of areas;
determine a reception state of the antenna with respect to each of the plurality of areas; and
control the oriented direction of the antenna to match a direction based on an area of which an index value indicating the reception state is highest among the plurality of areas.

* * * * *